US012707376B2

(12) United States Patent
Chen

(10) Patent No.: US 12,707,376 B2
(45) Date of Patent: Aug. 11, 2026

(54) ACCESS CONTROL METHOD AND APPARATUS, TERMINAL, AND NETWORK DEVICE

(71) Applicant: VIVO MOBILE COMMUNICATION CO., LTD., Dongguan (CN)

(72) Inventor: Li Chen, Chang'an Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 437 days.

(21) Appl. No.: 18/159,409

(22) Filed: Jan. 25, 2023

(65) Prior Publication Data

US 2023/0164681 A1 May 25, 2023

Related U.S. Application Data

(63) Continuation of application No. PCT/CN2021/109231, filed on Jul. 29, 2021.

(30) Foreign Application Priority Data

Jul. 31, 2020 (CN) ......................... 202010763505.9

(51) Int. Cl.
*H04W 48/16* (2009.01)
*H04W 48/02* (2009.01)
*H04W 48/08* (2009.01)
*H04W 72/23* (2023.01)

(52) U.S. Cl.
CPC ........... *H04W 48/16* (2013.01); *H04W 48/02* (2013.01); *H04W 48/08* (2013.01); *H04W 72/23* (2023.01)

(58) Field of Classification Search
CPC ..... H04W 48/16; H04W 48/02; H04W 48/08; H04W 72/23; H04W 48/12; H04W 48/10; H04W 48/20; H04L 5/0048
See application file for complete search history.

(56) References Cited

U.S. PATENT DOCUMENTS 11,089,536 B2 * 8/2021 Wei ........................ H04W 12/08
2016/0057692 A1 * 2/2016 Geng .................... H04W 48/02 370/329
2018/0020382 A1 1/2018 Kim et al.
(Continued)

FOREIGN PATENT DOCUMENTS

CN 102761933 A 10/2012
CN 103392372 A 11/2013
(Continued)

OTHER PUBLICATIONS

LG Electronics "Consideration on the framework to support reduced capability NR devices", 3GPP TSG RAN WG1 Meeting #101, R1-2004024, Jun. 5, 2020, 4 pgs.
(Continued)

*Primary Examiner* — Kenneth T Lam
(74) *Attorney, Agent, or Firm* — The Webb Law Firm

(57) ABSTRACT

An access control method and apparatus, a terminal, and a network device are disclosed in this application. The method includes: receiving a first access control parameter; determining a second access control parameter corresponding to the terminal based on the first access control parameter and a preset rule; and performing an access control-related operation according to the second access control parameter.

20 Claims, 4 Drawing Sheets

(56) References Cited

U.S. PATENT DOCUMENTS

| | | | | |
|---|---|---|---|---|
| 2018/0279207 | A1* | 9/2018 | Geng | H04W 48/08 |
| 2019/0261261 | A1 | 8/2019 | Ishii | |
| 2019/0327663 | A1* | 10/2019 | Wirth | H04W 48/02 |
| 2019/0349843 | A1* | 11/2019 | Choi | H04W 48/02 |
| 2020/0145911 | A1* | 5/2020 | Ma | H04W 36/0061 |
| 2021/0227451 | A1* | 7/2021 | Babaei | H04W 48/10 |
| 2021/0368529 | A1* | 11/2021 | Sakhnini | H04W 72/23 |
| 2022/0303883 | A1* | 9/2022 | Gao | H04W 48/02 |
| 2022/0338183 | A1* | 10/2022 | Zheng | H04W 72/044 |
| 2023/0075764 | A1* | 3/2023 | Liu | H04W 56/001 |
| 2023/0189124 | A1* | 6/2023 | Kusashima | H04L 5/0053 370/312 |
| 2025/0267557 | A1* | 8/2025 | Kusashima | H04L 5/0053 |

FOREIGN PATENT DOCUMENTS

| | | |
|---|---|---|
| CN | 104770012 A | 7/2015 |
| CN | 107018555 A | 8/2017 |
| CN | 107018556 A | 8/2017 |
| CN | 108271213 A | 7/2018 |
| CN | 108282751 A | 7/2018 |
| CN | 108347746 A | 7/2018 |
| CN | 108605266 A | 9/2018 |
| CN | 109803317 A | 5/2019 |
| CN | 111066346 A | 4/2020 |
| CN | 111345072 A | 6/2020 |

OTHER PUBLICATIONS

Samsung "Considerations on access barring and UE capability" , 3GPP TSG RAN WG1 #101, R1-2003913, Jun. 5, 2020, 2 pgs.

International Patent Application No. PCT/CN2021/109231, International Search Report and Written Opinion with Partial English Machine Translation mailed Nov. 3, 2021, 9 pages.

* cited by examiner

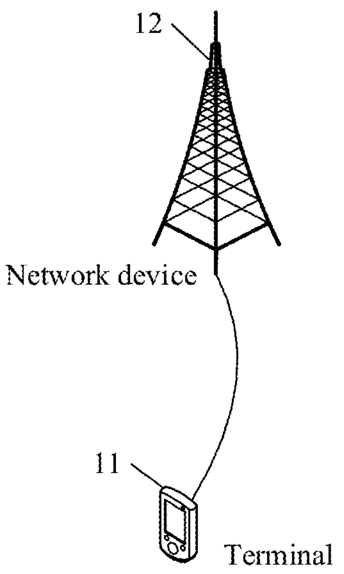
FIG. 1
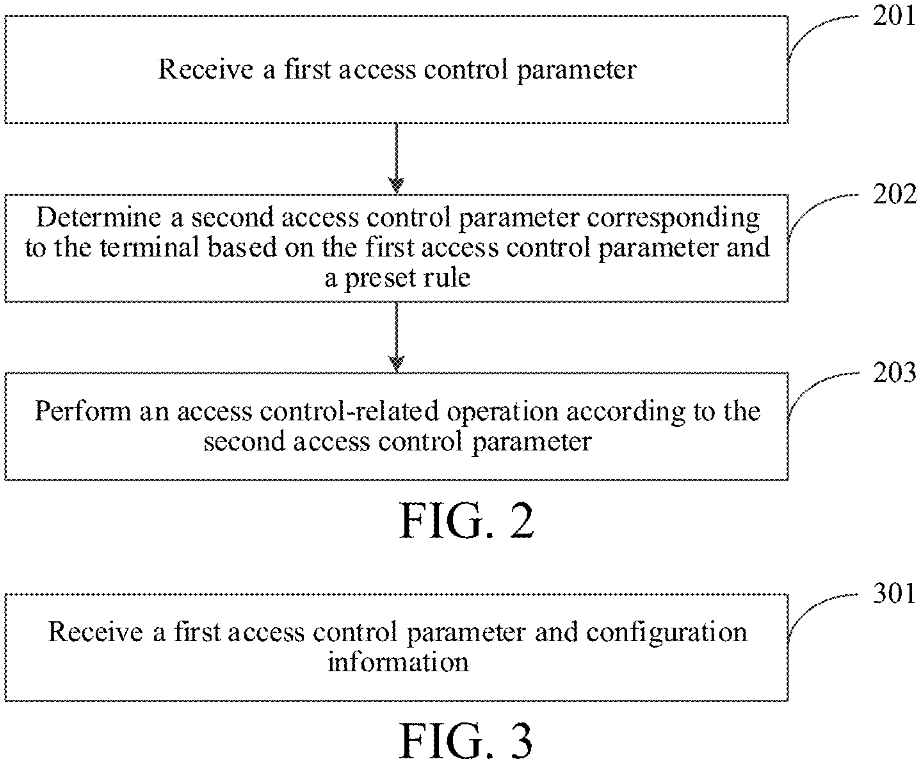
FIG. 2
FIG. 3

ACCESS CONTROL METHOD AND APPARATUS, TERMINAL, AND NETWORK DEVICE

CROSS-REFERENCE TO RELATED APPLICATIONS

This application is a continuation of International Application No. PCT/CN2021/109231, filed on Jul. 29, 2021, which claims priority to Chinese Patent Application No. 202010763505.9, filed with the China National Intellectual Property Administration on Jul. 31, 2020, which are incorporated herein by reference in their entireties.

TECHNICAL FIELD

This application belongs to the field of communications technologies, and specifically, to an access control method and apparatus, a terminal and a network device.

BACKGROUND

During the development of new radio (NR), there are various terminals in different types for adapting different application scenarios and requirements. For example, the lightweight terminal is introduced. Currently, for the lightweight terminal, the same access control is generally used, so that the flexibility of the existing terminal access control is poor.

SUMMARY

According to a first aspect of the present disclosure, an access control method is provided, applied to a terminal and including:

receiving a first access control parameter;

determining a second access control parameter corresponding to the terminal based on the first access control parameter and a preset rule; and performing an access control-related operation according to the second access control parameter.

According to a second of the present disclosure aspect, an access control method is provided, applied to a network device and including:

transmitting a first access control parameter and configuration information, where the configuration information is used for configuring a preset rule, and the preset rule and the first access control parameter are used for determining a second access control parameter corresponding to a terminal.

According to a third aspect of the present disclosure, an access control apparatus is provided, including:

a receiving module, configured to receive a first access control parameter;

a determining module, configured to determine a second access control parameter corresponding to a terminal based on the first access control parameter and a preset rule; and an execution module, configured to perform an access control-related operation according to the second access control parameter.

According to a fourth aspect of the present disclosure, an access control apparatus is provided, including:

a transmission module, configured to transmit a first access control parameter and configuration information, where the configuration information is used for configuring a preset rule, and the preset rule and the first access control parameter are used for determining a second access control parameter corresponding to a terminal.

According to a fifth aspect of the present disclosure, a terminal is provided, including a processor, a memory, and a program or instruction stored in the memory and runnable on the processor, where when the program or instruction is executed by the processor, the steps of the method according to the first aspect are implemented.

According to a sixth aspect of the present disclosure, a network device is provided, including a processor, a memory, and a program or instruction stored in the memory and runnable on the processor, where when the program or instruction is executed by the processor, the steps of the method according to the second aspect are implemented.

According to a seventh aspect of the present disclosure, a readable storage medium is provided, storing a program or instruction, where when the program or instruction is executed by a processor, the steps of the method according to the first aspect, or the steps of the method according to the second aspect are implemented.

According to an eighth aspect of the present disclosure, a chip is provided, including a processor and a communication interface, where the communication interface is coupled to the processor, and the processor is configured to run a program or instruction to implement the method according to the second aspect.

According to a ninth aspect of the present disclosure, a computer software product is provided, stored in a non-volatile storage medium and configured to be executed by at least one processor to implement the steps of the method according to the first aspect, or implement the steps of the method according to the second aspect.

According to a tenth aspect of the present disclosure, a communication device is provided, configured to perform the method according to the first aspect, or perform the method according to the second aspect.

BRIEF DESCRIPTION OF THE DRAWINGS

FIG. 1 is a structural diagram of a network system to which the embodiments of this application are applicable;

FIG. 2 is a first flowchart of an access control method according to an embodiment of this application;

FIG. 3 is a second flowchart of an access control method according to an embodiment of this application;

DETAILED DESCRIPTION

Figure 4:
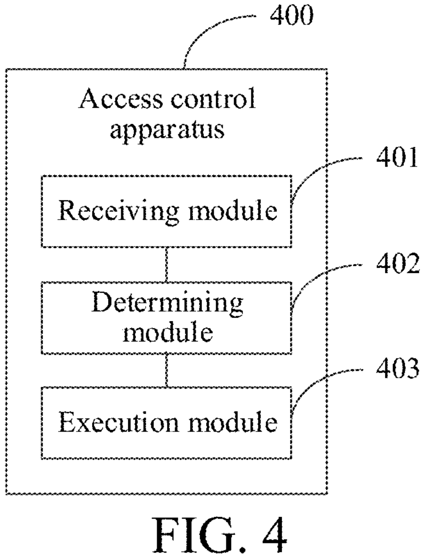
FIG. 4 is a first flowchart of an access control apparatus according to an embodiment of this application.

The following clearly describes the technical solutions in embodiments of this application with reference to the accompanying drawings in the embodiments of this application. Apparently, the described embodiments are some of the embodiments of this application rather than all of the embodiments. All other embodiments derived by a person of ordinary skill in the art based on the embodiments of this application without creative efforts shall fall within the protection scope of this application.

In the specification and claims of this application, the terms “first”, “second”, and the like are used to distinguish similar objects, but are not used to describe a specific sequence or order. It may be understood that the data used in such a way is interchangeable in proper circumstances, so that the embodiments of this application described herein can be implemented in other sequences than the sequence illustrated or described herein, and the objects distinguished through “first” and “second” are generally of a same type and the number of the objects are not limited, for example, a first object may be one or more than one. In addition, “and/or” in this specification and the claims represents at least one of the connected objects, and a character “/” used herein indicates an “or” relationship between associated objects.

It is to be noted that the technologies described in the embodiments of this application are not limited to a long term evolution (LTE)/LTE-advanced (LTE-A) system, and may be further applied to other wireless communication systems such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms “system” and “network” in the embodiments of this application are often used interchangeably, and the technology described can be applied to the systems and radio technologies mentioned above, and can also be applied to other systems and radio technologies. However, the following exemplarily describes a new radio (NR) system, and NR terms are used in most of the descriptions below, although these technologies can also be applied to applications other than the NR system, for example, the 6th generation (6G) communication system.

FIG. 1 shows a block diagram of a wireless communication system to which an embodiment of this application is applicable. The wireless communication system includes a terminal 11 and a network device 12. The terminal 11 may also be referred to as a terminal device or a user equipment (UE), and the terminal 11 may be a terminal side device, such as a mobile phone, a tablet computer, a laptop computer also referred to as a notebook computer, a personal digital assistant (PDA), a handheld computer, a netbook, an ultra-mobile personal computer (UMPC), a mobile Internet device (MID), a wearable device, a vehicle user equipment (VUE), or a pedestrian user equipment (PUE). The wearable device includes: a hand ring, a headset, a pair of glasses, or the like. It is to be noted that, a specific type of the terminal 11 is not limited in the embodiments of this application. The network device 12 may be a base station or a core network, where the base station may be referred to as a node B, an evolved node B, an access point, a base transceiver station (BTS), a radio base station, a radio transceiver, a basic service set (Basic Service Set, BSS), an extended service set (ESS), a Bnode, an evolved B Node (eNB), a home node B, a home evolved node B, a wireless local area network (WLAN) access point, a wireless fidelity (WiFi) node, a transmitting receiving point (TRP), or another proper term in the field as long as reaching the same technical effect. The base station is not limited to a specific technical word. It is to be noted that, only a base station in a NR system is taken as an example in this embodiment of this application, but a specific type of the base station is not limited.

For the ease of understanding, some content involved in the embodiments of this application are described below.

First: Lightweight terminal.

A lightweight terminal may be referred to as a reduced capability UE (RedCap, UE), or may be referred to as a light/lite UE. The lightweight terminal is mainly applicable to a wearable device, an industry sensor in an industry environment, or a video monitoring device. The lightweight terminal is referred to as a second type of terminal in each embodiment below.

This type of terminal generally refers to some devices with limited capabilities. The reduced capability of the lightweight terminal shows in many aspects, such as, a lower device complexity, a smaller device size, a weaker processing capability, and a smaller or lesser supportable feature, where the supportable feature may be understood as at least one of the following: a supportable carrier aggregation (CA) number, a supportable receiving antenna number, a most supportable bandwidth, a supportable peak value rate, or the like.

Second: Normal terminal.

A normal terminal may be understood as a non-light user equipment, or a terminal of a normal category defined in Rel-15 or Rel-16. The normal terminal is referred to as a first type of terminal in each embodiment below.

Third: Basic procedures for a normal terminal system access.

1. Cell Search: including synchronization of a synchronization signal and PBCH block (SSB) and receiving of system information. Alternatively, a primary synchronization signal (PSS) is received first before receiving a secondary synchronization signal (SSS) before receiving a physical broadcast channel (PBCH): obtaining an SSB index, a PBCH demodulation reference signal (DMRS), and information in a master information block (MIB).

2. System information (SI) of broadcast including information required for accessing a system is received according to the foregoing obtained information.

3. A random access is performed according to the foregoing obtained information required for a system access.

Fourth: Access control feature.

A plurality of access control schemes are defined in LTE, including: access class barring (ACB), extended access barring (EAB), service specific access control (SSAC), and application-specific congestion control for data communication (ACDC).

In a new radio (NR) system, unified access control (UAC) is normalized. Access control on a terminal is implemented through configuring access control information corresponding to an ID via network.

An access control method according to the embodiments of this application is described in detail below with reference to the accompany drawings through specific embodiments and application scenarios thereof.

FIG. 2 is a flowchart of an access control method according to an embodiment of this application. The method is applied to a terminal, as shown in FIG. 2, and includes the following steps:

Step 201: Receive a first access control parameter.

In this embodiment, the foregoing first access control parameter may be understood as access control parameter information, that is, a specific parameter value of an access control parameter. Access control of the terminal may include N access control parameters, and the N access control parameters constitute a set of access control parameters, where a value of N may be a positive integer. The terminal is configured with M sets of access control parameters through the foregoing first access control parameter, where M is a positive integer.

When M is 1, for example, the first access control parameter is a set of access control parameters.

When M is greater than 2, at least part of the parameters included in the first access control parameter have at least two values. In other words, the terminal is configured with at least two set of access control parameters through the foregoing first access control parameter. For example, the first access control parameter may be M sets of access control parameters, where values of at least part of access control parameters in every two different sets of access control parameters are different (it may exist that values of other access control parameters are the same); or, the first access control parameter may include a set of access control parameters, and at least one access control parameter among the set of access control parameters (for example, there are L parameters) has two or more than two values. M sets of access control parameters may be obtained through replacing values of the L access control parameters with values of part of the access control parameters in a set of access control parameters.

Assuming that a set of access control parameters is A, B, and C (that is, N=3), and the terminal is configured with two sets of access control parameters through the first access control parameter: one set is A1, B1, and C1, and the other set is A1, B2, and C1 (that is, M=2). In this case, the foregoing first access control parameter may directly include the two sets of access control parameters, or may include A1, B1, B2, and C1 (that is, L=1). In this case, based on the first access control parameter, the terminal may obtain two sets of access control parameters: one set is A1, B1, and C1, and the other set is A1, B2, and C1.

For example, in an embodiment, the foregoing first access control parameter includes at least one of the following:

an access control category;

access control public land mobile network information;

a probability parameter of access control;

an access-prohibition factor of access control;

duration-related information of access control;

identification information corresponding to access control;

type information corresponding to access control;

access control level information;

a reason value for establishing a radio resource control (Radio Resource Control, RRC) connection;

an access attempt category; or event information corresponding to access control.

Step 202: Determine a second access control parameter corresponding to the terminal based on the first access control parameter and a preset rule.

In this embodiment of this application, the foregoing second access control parameter may be understood as access control parameter information, that is, a specific parameter value of an access control parameter. Further, the foregoing second access control parameter may be understood as a set of access control parameters. The foregoing preset rule may be configured by a network device, or may be specified in a protocol, which is not further limited herein. In this way, the foregoing preset rule is used for determining an access control parameter corresponding to the terminal based on relevant information of the terminal, so that the access control flexibility of the terminal may be improved.

Step 203: Perform an access control-related operation according to the second access control parameter.

The access control-related operation may be set according to an actual situation. For example, in an embodiment, the relevant operation may include, but is not limited to, at least one of the following: whether to allow to camp on the first cell; whether to prohibit to access the first cell or prohibit to access the first cell in a preset time; whether to access the first cell or allow to perform an access attempt for the first cell; or whether to choose or re-choose a cell.

The foregoing first cell may be understood as an adjacent cell or a serving cell. For the adjacent cell, the first access control parameter is transmitted through a broadcast message, and the terminal may obtain the first access control parameter during receiving system information of broadcast. For the serving cell, the first access control parameter may be transmitted through the broadcast message, an RRC message, or the like. That is to say, in this embodiment of this application, the foregoing first access control parameter may be carried through at least one of the following: a physical broadcast channel PBCH, a master information block MIB, system information of a first system information block (System Information Block, SIB), extended system information, or a dedicated RRC message, wherein the first SIB is an SIB corresponding to a first type of terminal.

In this embodiment of this application, the first access control parameter is received. The second access control parameter corresponding to the terminal is determined based on the first access control parameter and the preset rule. The access control-related operation is performed according to the second access control parameter. In this way, the access control parameter corresponding to the terminal is determined based on the preset rule, so as to improve the access control flexibility of the terminal.

Optionally, in this embodiment of this application, the access control method may be applied to a second type of terminal, and the access of the second type of terminal is controlled flexibly, so as to avoid that a large amount of access of the second type of terminal affects the performance of the first type of terminal.

In an embodiment, the determining a second access control parameter corresponding to the terminal based on the first access control parameter and a preset rule includes at least one of the following:

adjusting, in a case that the first access control parameter includes a set of access control parameters, at least part of the parameters in the first access control parameter according to the preset rule to obtain the second access control parameter; or selecting, in a case that the at least part of the parameters included in the first access control parameter have at least two values, a value of an access control parameter of the terminal from the first access control parameter according to the preset rule as the second access control parameter.

In this embodiment, that the first access control parameter includes a set of access control parameters may also be understood as: the terminal is configured with a set of access control parameters by the first cell through the first access control parameter. That the at least part of the parameters included in the first access control parameter have at least two values may be understood as: the terminal is configured with at least two set of access control parameters by the first cell through the first access control parameter.

For example, it may be defined based on the foregoing preset rule that: the terminal corresponds to a set of access control parameters in a state 1, and corresponds to another set of access control parameters in a state 2; or a terminal with a first attribute corresponds to a set of access control parameters, and a terminal with a second attribute corresponds to another set of access control parameters.

Optionally, in an embodiment, when the foregoing first access control parameter is used for indicating a set of access control parameters, assuming that the first access control parameter corresponds to the state 1, then when a current state of the terminal is the state 1, the terminal may determine that the first access control parameter is the second access control parameter, and when the current state of the terminal is the state 2, part of or all of the access control parameters in the first access control parameter are adjusted to obtain the second access control parameter. In another embodiment, when the foregoing first access control parameter is used for indicating a first set of access control parameters and a second set of access control parameters, assuming that the first access control parameter corresponds to the state 1, then when a current state of the terminal is the state 1, the terminal may determine that the first set of access control parameters is the second access control parameter, and when the current state of the terminal is the state 2, the terminal may determine that the second set of access control parameters is the second access control parameter.

Or, optionally, in an embodiment, when the foregoing first access control parameter is used for indicating a set of access control parameters, assuming that the first access control parameter corresponds to the terminal with the first attribute, then the terminal with the first attribute may determine that the first access control parameter is the second access control parameter, and a part of or all of the access control parameters in the first access control parameter are adjusted by the terminal with the second attribute to obtain the second access control parameter. In another embodiment, when the foregoing first access control parameter is used for indicating a first set of access control parameters and a second set of access control parameters, assuming that the first access control parameter corresponds to the terminal with the first attribute, then the terminal with the first attribute may determine that the first set of access control parameters is the second access control parameter, and the terminal with the first attribute may determine that the second set of access control parameters is the second access control parameter.

It is to be noted that, the foregoing state may be understood as current state information of the terminal, for example, and may be shown through a measurement value or measurement change value of a reference signal. The foregoing attribute of the terminal may be understood as a certain type of terminal, and specific attribute-related information may be shown through measurement performance, a category, a type, an application scenario, registration information, a capability attribute, and a supported slice.

It is to be understood that the foregoing preset rule may be set according to an actual requirement. For example, in an embodiment, the preset rule includes: determining the second access control parameter according to target information of the terminal and a relevant parameter corresponding to the target information, where the target information includes at least one of the following: measurement performance, a category, a type, an application scenario, registration information, a capability attribute, or a supported slice.

In this embodiment, the access control parameter of the terminal is determined through setting target information and the relevant parameter corresponding to the target information, so that the access of the terminal may be controlled flexibly, thereby ensuring that a large amount of system access of one type of terminal does not affect access performance of another type of terminal.

Optionally, the measurement performance includes a measurement value of a preset reference signal, or a measurement change value of the preset reference signal in a preset time period.

The preset reference signal may include a synchronization signal and PBCH block SSB, a channel state information reference signal (Channel State Information Reference Signal, CSI-RS), a positioning reference signal (Positioning Reference Signal, PRS), and a demodulation reference signal DMRS. Certainly, in other embodiments, the preset reference signal may further be defined as a reference signal of another category.

The foregoing measurement value may be understood as a reference signal received power (RSRP), reference signal received quality (RSRQ), a signal to interference plus noise ratio (SINR), a received signal strength indication (RSSI), or the like.

Optionally, the foregoing capability attribute includes at least one of the following: a capability, a capability set, a feature, or a feature set.

It is to be noted that, at least one of the foregoing target information and the relevant parameter is specified in a protocol or configured by a network device.

In this embodiment, information included in the foregoing target information may be specified in a protocol or configured by a network device. In addition, a relevant parameter corresponding to indicated information may also be specified in a protocol or configured by a network device. The relevant parameter may include at least one of the following: a contrast value of the measurement performance, a contrast value of the category, a contrast value of the type, a contrast value of the application scenario, a contrast value of the registration information, a threshold of the capability attribute, or a contrast value of the slice.

It is to be understood that, for different foregoing target information, corresponding manners for determining the second access control parameter are different. The foregoing preset rule is described in detail below. For example, the preset rule includes at least one of the following:

- a measurement attribute of the terminal is contrasted with a first reference value to determine the second access control parameter;
- the category of the terminal is contrasted with a second reference value to determine the second access control parameter;
- the type of the terminal is contrasted with a third reference value to determine the second access control parameter;
- the application scenario of the terminal is contrasted with a fourth reference value to determine the second access control parameter;
- the registration information of the terminal is contrasted with a fifth reference value to determine the second access control parameter;
- the capability attribute of the terminal is contrasted with a preset reference threshold to determine the second access control parameter; or
- the supported slice of the terminal is contrasted with a sixth reference value to determine the second access control parameter.

For the measurement attribute, the foregoing first reference may be a reference threshold, or may be one or a plurality of contrast values. Description is made by taking an example in which the first reference value is a reference threshold. A measurement value and/or a measurement change value of a reference signal corresponding to the measurement attribute may be contrasted with the first reference value, and in a case that the measurement value and/or the measurement change value of the reference signal corresponding to the measurement attribute is greater than the first reference value, the terminal corresponds to a set of access control parameters; and in a case that the measurement value and/or the measurement change value of the reference signal corresponding to the measurement attribute is less than or equal to the first reference value, the terminal corresponds to another set of access control parameters.

For the category, different categories correspond to different category values. The category value, for example, may be an identification value or index value of the category. The foregoing second reference value may be understood as a contrast value of the category, and a category value corresponding to a category of the terminal is contrasted with the second reference value to determine an access control parameter corresponding to the current category of the terminal. For example, in a case that the category value of the current category of the terminal is a first value, the terminal corresponds to a set of access control parameters; and in a case that the category value of the current category of the terminal is a second value, the terminal corresponds to another set of access control parameters. It is to be understood that, a set of access control parameters may correspond to one or a plurality of contrast values of the category, and a contrast value corresponding to one access control parameters is different from a contrast value corresponding to another set of access control parameters.

For the type, different types correspond to different type values. The type value, for example, may be an identification value or index value of the type. The foregoing third reference value may be understood as a contrast value of the type, and a type value corresponding to a type of the terminal is contrasted with the third reference value to determine an access control parameter corresponding to the current type of the terminal. For example, in a case that the type value of the current type of the terminal is a first value, the terminal corresponds to a set of access control parameters; and in a case that the type value of the current type of the terminal is a second value, the terminal corresponds to another set of access control parameters. It is to be understood that, a set of access control parameters may correspond to one or a plurality of contrast values of the type, and a contrast value corresponding to one access control parameters is different from a contrast value corresponding to another set of access control parameters.

For the application scenario, different application scenarios correspond to different application scenario values. The application scenario value, for example, may be an identification value or index value of the application scenario. The foregoing fourth reference value may be understood as a contrast value of the application scenario, and an application scenario value corresponding to an application scenario of the terminal is contrasted with the fourth reference value to determine an access control parameter corresponding to the current application scenario of the terminal. For example, in a case that the application scenario value of the current application scenario of the terminal is a first value, the terminal corresponds to a set of access control parameters; and in a case that the application scenario value of the current application scenario of the terminal is a second value, the terminal corresponds to another set of access control parameters. It is to be understood that, a set of access control parameters may correspond to one or a plurality of contrast values of the application scenario, and a contrast value corresponding to one access control parameters is different from a contrast value corresponding to another set of access control parameters.

For the registration information, different registration information correspond to different registration information values. The registration information value, for example, may be an identification value or index value of the registration information. The foregoing fifth reference value may be understood as a contrast value of the registration information, and a registration information value corresponding to registration information of the terminal is contrasted with the fifth reference value to determine an access control parameter corresponding to the current registration information of the terminal. For example, in a case that the registration information value of the current registration information of the terminal is a first value, the terminal corresponds to a set of access control parameters; and in a case that the registration information value of the current registration information of the terminal is a second value, the terminal corresponds to another set of access control parameters. It is to be understood that, a set of access control parameters may correspond to one or a plurality of contrast values of the registration information, and a contrast value corresponding to a set of access control parameters is different from a contrast value corresponding to another set of access control parameters.

For the capability attribute, the foregoing preset reference threshold may be understood as a contrast value of the capability attribute. A value corresponding to the capability attribute is contrasted with the preset reference threshold, and in a case that the value corresponding to the capability attribute is greater than the preset reference threshold, the terminal corresponds to a set of access control parameters; and in a case that the value corresponding to the capability attribute is less than or equal to the preset reference threshold, the terminal corresponds to another set of access control parameters.

For example, when a preset condition is met, the terminal corresponds to a set of access control parameters; otherwise the terminal corresponds to another set of access control parameters. The preset condition includes at least one of the following:

a bandwidth capability is less than 100 MHz;

an antenna quantity capability is less than 4, equal to 2, or equal to 1;

a peak value rate capability is less than 100 Mbps;

a processing delay capability is less than the preset time;

a supported carrier quantity capability is less than a certain value; or an emitting power capability is less than a certain value.

For the foregoing supported slice, different slices are supported to correspond to different access control parameters.

In this embodiment, the foregoing category may be defined according to the feature set, the capability set, or different data rates. Different UE types may be defined according to the feature set, the capability set, or different data rates (data rate). Optionally, for different types, even if in the same category, terminals may correspond to different types, for example, a high end UE and a low end UE. For different use cases, different categories or different types may correspond to different application scenarios, or terminals of a same category or same type may be in different application scenarios in a use case, for example, applied to a wearable device of a personal service and an industry sensor of an industry field. For the low end UE, a low end wearable device may also be distinguished from a low end industry sensor (Low end industry sensor). The foregoing registration information generally refers to subscription information of the UE, for example, corresponding registration information of an operator in a subscriber identity module (SIM) card, including at least one of the following: an SIM card category, an SIM card service category, SIM card expense information, an SIM card priority, a client rank of the operator, or the like. Different initial access resources may be configured to correspond to different registration information.

For the foregoing supported slice, the foregoing sixth reference value may be understood as a contrast value of the slice. Identification of the slice may be contrasted with the contrast value, so as to determine the second access control parameter corresponding to the terminal based on the current supported slice of the terminal. For example, in a case that the supported slice of the terminal is a slice 1, the terminal corresponds to a set of access control parameters; and in a case that the supported slice of the terminal is a slice 2, the terminal corresponds to another set of access control parameters. It is to be understood that, a set of access control parameters may correspond to one or a plurality of contrast values of the slice, and a contrast value corresponding to one access control parameters is different from a contrast value corresponding to another set of access control parameters.

It is to be noted that, the second access control parameter may be determined singly through a piece of information in the foregoing target information, or may be determined jointly through a plurality of pieces of information in the foregoing target information. For example, each piece of information is used for determining a value corresponding to one or a plurality of access control parameters in a set of access control parameters, and different information is used for determining a value corresponding to different access control parameters.

Optionally, the extended system information includes at least one of the following:

- system information corresponding to a second type of terminal in a first SIB1, where the first SIB1 belongs to the first SIB;
- system information corresponding to the second type of terminal in an SIBx, where x is an integer greater than 1, the SIBx belongs to a second SIB, and the second SIB is an SIB corresponding to the second type of terminal, where in this embodiment, SIBx is a newly added SIB on the basis of an existing SIB; or
- system information corresponding to the second type of terminal in an SIBy, where y is an integer greater than 1, and the SIBy belongs to the first SIB, where in this embodiment, SIBy is a newly added extended information element (IE), and the extended information field includes the system information of the second type of terminal.

In this embodiment, the foregoing first SIB1 may be referred to as an SIB1-extend, which refers to an extension on the basis of a traditional SIB1 to add extra SIB1 system information used for indicating allowing to support the second type of terminal or allowing the second type of terminal to access. In other words, the foregoing system information corresponding to the second type of terminal in the first SIB1 is used for indicating any one of the following:

- system information supporting the second type of terminal; or
- system information allowing the second type of terminal to camp on or access.

The terminal may determine at least one of the following based on the system information corresponding to the second type of terminal: whether the first cell supports the second type of terminal; or whether the first cell allows the second type of terminal to access or camp on.

The foregoing SIBx may be understood as another SIB newly added in the second SIB other than the second SIB1, and may be used for carrying the system information corresponding to the second type of terminal. In the system information, at least one of the following may be indicated explicitly or implicitly: whether the first cell supports the second type of terminal; or whether the first cell allows the second type of terminal to access or camp on.

The foregoing SIBy may be understood as an SIB obtained through an extension based on an SIB after a traditional first SIB1, for example, an SIB obtained through an extension based on a certain SIB among traditional SIB2, SIB3, SIB4, . . . , and SIBn, where the SIBy may be referred to as SIB2-light, SIB3-light, SIB4-light, . . . , and SIBn-light. The SIBy includes system information required by the first cell for the second type of terminal, and at least one of the following may be indicated explicitly or implicitly through the system information: whether the first cell supports the second type of terminal; or whether the first cell allows the second type of terminal to access or camp on.

Optionally, the system information corresponding to the second type of terminal in the SIBx and the SIBy is used for indicating: system information required by a cell accessed or camped on by the second type of terminal.

In an embodiment, when the SIBx or the SIBy indicates the system information required by the cell accessed or camped on by the second type of terminal, it may be understood by the terminal that, the first cell supports the second type of terminal; or it may be understood that the first cell allows the second type of terminal to access or camp on, and an access or camping on process may be performed in this case. Certainly, in another embodiment, the SIBx or the SIBy may further include another indication identification used for indicating at least one of the following: whether the first cell supports the second type of terminal; or whether the first cell allows the second type of terminal to access or camp on.

It is to be noted that, a value of the foregoing x and y may be indicated through part of information elements (Information element, IE) of a traditional SIB1 message.

Optionally, in an embodiment, the performing an access control-related operation according to the second access control parameter includes at least one of the following:

- in a case of determining that a first cell is prohibited to be accessed according to the second access control parameter, performing a first operation; or
- in a case of determining that the first cell is accessible according to the second access control parameter, performing a second operation, where
- the first operation includes at least one of the following:
- not allowing to camp on the first cell;
- prohibiting to access the first cell or prohibiting to access the first cell in a preset time;
- not accessing the first cell or not allowing to perform an access attempt for the first cell; or
- choosing or re-choosing a cell; and
- the second operation includes at least one of the following:
- allowing to camp on the first cell;
- not prohibiting to access the first cell;
- allowing to access the first cell; or
- allowing to perform an access attempt for the first cell.

FIG. 3 is a flowchart of another access control method according to an embodiment of this application. The method is applied to a network device, as shown in FIG. 3, and includes the following steps:

Step 301: Transmit a first access control parameter and configuration information, where the configuration information is used for configuring a preset rule, and the preset rule and the first access control parameter are used for determining a second access control parameter corresponding to a terminal.

Optionally, the first access control parameter meets any one of the following:

- the first access control parameter includes a set of access control parameters; or
- at least part of access control parameters of the first access control parameter includes at least two values.

Optionally, the preset rule includes: determining the second access control parameter according to target information of the terminal and a relevant parameter corresponding to the target information, where the target information includes at least one of the following: measurement performance, a category, a type, an application scenario, registration information, a capability attribute, or a supported slice.

Optionally, the measurement performance includes a measurement value of a preset reference signal, or a measurement change value of the preset reference signal in a preset time period.

Optionally, the preset reference signal includes at least one of the following: a synchronization signal and PBCH block SSB, a channel state information reference signal CSI-RS, a positioning reference signal PRS, or a demodulation reference signal DMRS.

Optionally, the capability attribute includes at least one of the following: a capability, a capability set, a feature, or a feature set.

Optionally, at least one of the target information and the relevant parameter is specified in a protocol or configured by a network device.

Optionally, the relevant parameter includes at least one of the following: a contrast value of the measurement performance, a contrast value of the category, a contrast value of the type, a contrast value of the application scenario, a contrast value of the registration information, a threshold of the capability attribute, or a contrast value of the slice.

Optionally, the first access control parameter is carried through at least one of the following: a physical broadcast channel PBCH, a master information block MIB, system information of a first SIB, extended system information, or a dedicated RRC message, where

- the first SIB is an SIB corresponding to a first type of terminal.

Optionally, the extended system information includes at least one of the following:

- system information corresponding to a second type of terminal in a first SIB1, where the first SIB1 belongs to the first SIB;
- system information corresponding to the second type of terminal in an SIBx, where x is an integer greater than 1, the SIBx belongs to a second SIB, and the second SIB is an SIB corresponding to the second type of terminal; or
- system information corresponding to the second type of terminal in an SIBy, where y is an integer greater than 1, and the SIBy belongs to the first SIB.

Optionally, the system information corresponding to the second type of terminal in the first SIB1 is used for indicating any one of the following:

- system information supporting the second type of terminal; or
- system information allowing the second type of terminal to camp on or access.

Optionally, the system information corresponding to the second type of terminal in the SIBx and the SIBy is used for indicating: system information required by a cell accessed or camped on by the second type of terminal.

Optionally, the second type of terminal is a lightweight terminal.

It is to be noted that, this embodiment is an implementation of a network device corresponding to the embodiment shown in FIG. 2. For a specific implementation of this embodiment, reference may be made to related description of the embodiment shown in FIG. 2, and the same beneficial effects are achieved. Details are not described herein again to avoid repetition.

It is to be noted that, the access control method according to the embodiments of this application may be performed by an access control apparatus, or, a control module configured to perform the access control method in the access control apparatus. In an embodiment of this application, that the access control apparatus performs the access control method is taken as an example for description of the access control apparatus according to this embodiment of this application.

FIG. 4 is a structural diagram of an access control apparatus according to an embodiment of this application. As shown in FIG. 4, an access control apparatus 400 includes:

- a receiving module 401, configured to receive a first access control parameter;
- a determining module 402, configured to determine a second access control parameter corresponding to a terminal based on the first access control parameter and a preset rule; and
- an execution module 403, configured to perform an access control-related operation according to the second access control parameter.

Optionally, the determining module 403 is configured to perform at least one of the following:

- adjusting, in a case that the first access control parameter includes a set of access control parameters, at least part of the parameters in the first access control parameter according to the preset rule to obtain the second access control parameter; or
- selecting, in a case that the at least part of the parameters included in the first access control parameter have at least two values, a value of an access control parameter of the terminal from the first access control parameter according to the preset rule as the second access control parameter.

Optionally, the preset rule includes: determining the second access control parameter according to target information of the terminal and a relevant parameter corresponding to the target information, where the target information includes at least one of the following: measurement performance, a category, a type, an application scenario, registration information, a capability attribute, or a supported slice.

Optionally, the measurement performance includes a measurement value of a preset reference signal, or a measurement change value of the preset reference signal in a preset time period.

Optionally, the preset reference signal includes at least one of the following: a synchronization signal and PBCH block SSB, a channel state information reference signal CSI-RS, a positioning reference signal PRS, or a demodulation reference signal DMRS.

Optionally, the capability attribute includes at least one of the following: a capability, a capability set, a feature, or a feature set.

Optionally, at least one of the target information and the relevant parameter is specified in a protocol or configured by a network device.

Optionally, the relevant parameter includes at least one of the following: a contrast value of the measurement performance, a contrast value of the category, a contrast value of the type, a contrast value of the application scenario, a contrast value of the registration information, a threshold of the capability attribute, or a contrast value of the slice.

Optionally, the first access control parameter is carried through at least one of the following: a physical broadcast channel PBCH, a master information block MIB, system information of a first SIB, extended system information, or a dedicated RRC message, where the first SIB is an SIB corresponding to a first type of terminal.

Optionally, the extended system information includes at least one of the following:

system information corresponding to a second type of terminal in a first SIB1, where the first SIB1 belongs to the first SIB;

system information corresponding to the second type of terminal in an SIBx, where x is an integer greater than 1, the SIBx belongs to a second SIB, and the second SIB is an SIB corresponding to the second type of terminal; or system information corresponding to the second type of terminal in an SIBy, where y is an integer greater than 1, and the SIBy belongs to the first SIB.

Optionally, the system information corresponding to the second type of terminal in the first SIB1 is used for indicating any one of the following:

system information supporting the second type of terminal; or system information allowing the second type of terminal to camp on or access.

Optionally, the system information corresponding to the second type of terminal in the SIBx and the SIBy is used for indicating: system information required by a cell accessed or camped on by the second type of terminal.

Optionally, the second type of terminal is a lightweight terminal.

Optionally, the first access control parameter includes at least one of the following:

an access control category;

access control public land mobile network information;

a probability parameter of access control;

an access-prohibition factor of access control;

duration-related information of access control;

identification information corresponding to access control;

type information corresponding to access control;

access control level information;

a reason value for establishing a radio resource control RRC connection;

an access attempt category; or event information corresponding to access control.

Optionally, the determining module 403 is configured to perform at least one of the following:

in a case of determining that a first cell is prohibited to be accessed according to the second access control parameter, performing a first operation; or in a case of determining that the first cell is accessible according to the second access control parameter, performing a second operation, where the first operation includes at least one of the following:

not allowing to camp on the first cell;

prohibiting to access the first cell or prohibiting to access the first cell in a preset time;

not accessing the first cell or not allowing to perform an access attempt for the first cell; or choosing or re-choosing a cell; and the second operation includes at least one of the following:

allowing to camp on the first cell;

not prohibiting to access the first cell;

allowing to access the first cell; or allowing to perform an access attempt for the first cell.

The access control apparatus according to this embodiment of this application can implement all processes of the method embodiments shown in FIG. 2, and details are not described herein again to avoid repetition.

Figure 5:
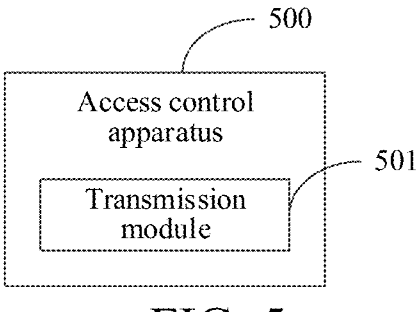
FIG. 5 is a second flowchart of an access control apparatus according to an embodiment of this application.

FIG. 5 is a structural diagram of an access control apparatus according to an embodiment of this application. As shown in FIG. 5, an access control apparatus 500 includes:

a transmission module 501, configured to transmit a first access control parameter and configuration information, where the configuration information is used for configuring a preset rule, and the preset rule and the first access control parameter are used for determining a second access control parameter corresponding to a terminal.

Optionally, the first access control parameter meets any one of the following:

the first access control parameter includes a set of access control parameters; or at least part of access control parameters of the first access control parameter includes at least two values.

Optionally, the preset rule includes: determining the second access control parameter according to target information of the terminal and a relevant parameter corresponding to the target information, where the target information includes at least one of the following: measurement performance, a category, a type, an application scenario, registration information, a capability attribute, or a supported slice.

Optionally, the measurement performance includes a measurement value of a preset reference signal, or a measurement change value of the preset reference signal in a preset time period.

Optionally, the preset reference signal includes at least one of the following: a synchronization signal and PBCH block SSB, a channel state information reference signal CSI-RS, a positioning reference signal PRS, or a demodulation reference signal DMRS.

Optionally, the capability attribute includes at least one of the following: a capability, a capability set, a feature, or a feature set.

Optionally, at least one of the target information and the relevant parameter is specified in a protocol or configured by a network device.

Optionally, the relevant parameter includes at least one of the following: a contrast value of the measurement performance, a contrast value of the category, a contrast value of the type, a contrast value of the application scenario, a contrast value of the registration information, a threshold of the capability attribute, or a contrast value of the slice.

Optionally, the first access control parameter is carried through at least one of the following: a physical broadcast channel PBCH, a master information block MIB, system information of a first SIB, extended system information, or a dedicated RRC message, where the first SIB is an SIB corresponding to a first type of terminal.

Optionally, the extended system information includes at least one of the following:

system information corresponding to a second type of terminal in a first SIB1, where the first SIB1 belongs to the first SIB;

system information corresponding to the second type of terminal in an SIBx, where x is an integer greater than 1, the SIBx belongs to a second SIB, and the second SIB is an SIB corresponding to the second type of terminal; or system information corresponding to the second type of terminal in an SIBy, where y is an integer greater than 1, and the SIBy belongs to the first SIB.

Optionally, the system information corresponding to the second type of terminal in the first SIB1 is used for indicating any one of the following:

system information supporting the second type of terminal; or system information allowing the second type of terminal to camp on or access.

Optionally, the system information corresponding to the second type of terminal in the SIBx and the SIBy is used for indicating: system information required by a cell accessed or camped on by the second type of terminal.

Optionally, the second type of terminal is a lightweight terminal.

The access control apparatus according to this embodiment of this application can implement all processes of the method embodiments shown in FIG. 3, and details are not described herein again to avoid repetition.

The access control apparatus in this embodiment of this application may be an apparatus, or may be a component, an integrated circuit, or a chip in a terminal. The apparatus may be a mobile terminal or may be a non-mobile terminal. Exemplarily, the mobile terminal may include but is not limited to the category of the terminal 11 listed above. The non-mobile terminal may be a server, a network attached storage (NAS), a personal computer (PC), a television (TV), a teller machine, a self-service machine, or the like, which is not specifically limited in this embodiment of this application.

The access control apparatus in this embodiment of this application may be an apparatus with an operating system. The operating system may be an Android operating system, an ios operating system, or another possible operating system, which is not specifically limited in this embodiment of this application.

The access control apparatus according to this embodiment of this application can implement all processes implemented by the method embodiments shown in FIG. 2 to FIG. 3, and the same beneficial effects are achieved. Details are not described herein again to avoid repetition.

Figures 6, 7:
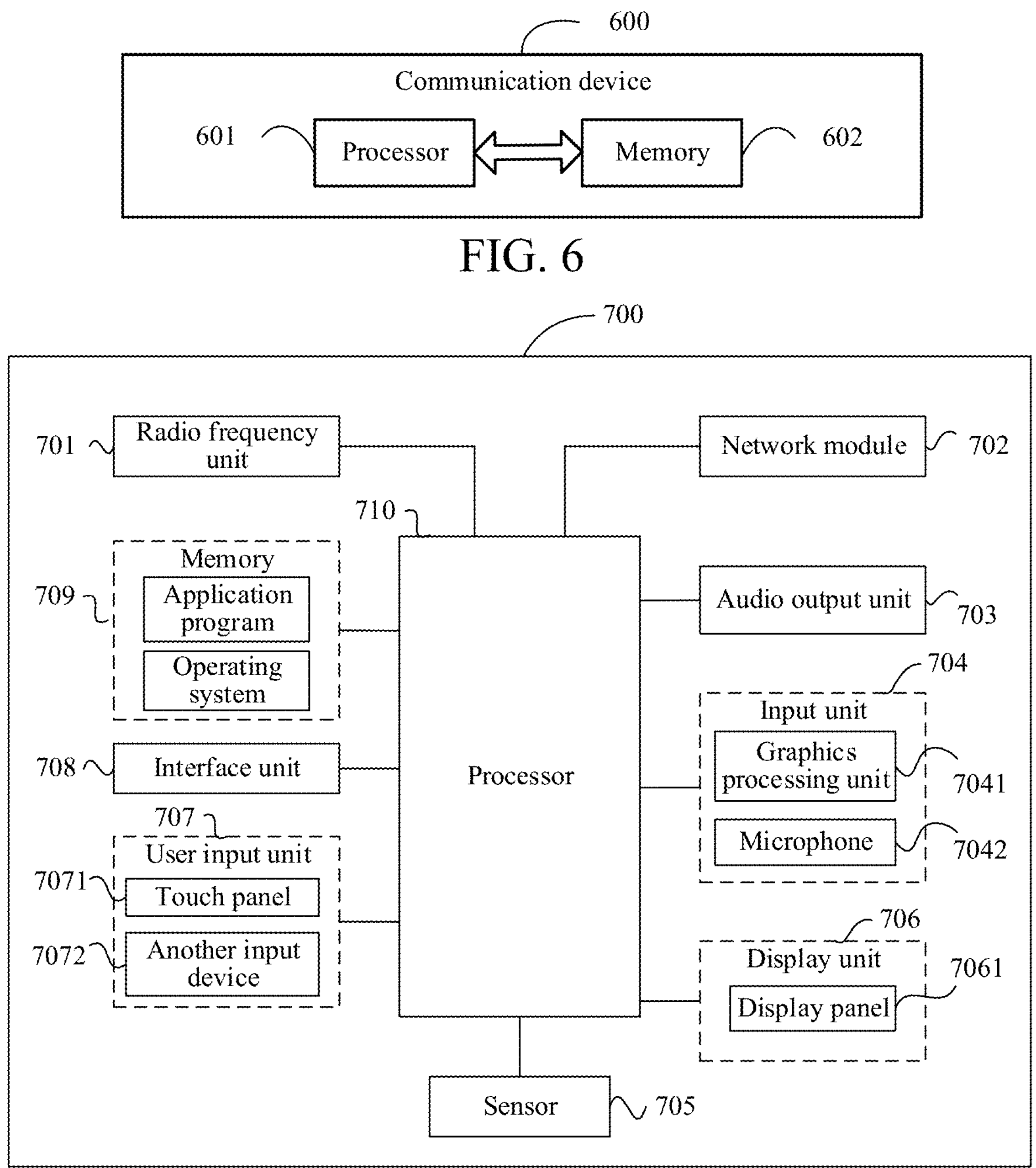
FIG. 6 is a structural diagram of a communication device according to an embodiment of this application.
FIG. 7 is a structural diagram of a terminal according to an embodiment of this application.

Optionally, as shown in FIG. 6, the embodiments of this application further provide a communication device 600, including a processor 601, a memory 602, and a program or instruction stored in the memory 602 and runnable on the processor 601, where the program or instruction, when executed by the processor 601, implements each process of the foregoing access control method, and the same technical effects can be achieved. To avoid repetition, details are not described herein again.

FIG. 7 is a schematic diagram of a hardware structure of a terminal for implementing various embodiments of this application.

The terminal 700 includes, but is not limited to, components such as a radio frequency unit 701, a network module 702, an audio output unit 703, an input unit 704, a sensor 705, a display unit 706, a user input unit 707, an interface unit 708, a memory 709, and a processor 710.

A person skilled in the art may understand that the terminal 700 may further include a power supply (such as a battery) for supplying power to the components. The power supply may be logically connected to the processor 710 by using a power management system, thereby implementing functions such as charging, discharging, and power consumption management by using the power management system. A terminal structure shown in FIG. 7 constitutes no limitation on the terminal, and the terminal may include more or fewer components than those shown in the figure, or some components may be combined, or a different component deployment may be used, which are not described herein again.

It is to be understood that, in this embodiment of this application, the input unit 704 may include a graphics processing unit (GPU) 7041 and a microphone 7042, and the graphics processing unit 7041 processes static pictures or video image data obtained by an image capturing device (such as a camera) in a video capturing mode or an image capturing mode. The display unit 706 may include a display panel 7061, and the display panel 7061 may be configured by using a liquid crystal display, an organic light-emitting diode, or the like. The user input unit 707 includes a touch panel 7071 and another input device 7072. The touch panel 7071 is also referred to as a touch screen. The touch panel 7071 may include two parts: a touch detection apparatus and a touch controller. The another input device 7072 may include, but is not limited to, a physical keyboard, a functional key (such as a volume control key or a switch key), a track ball, a mouse, and a joystick, which are not described herein again.

In this embodiment of this application, the radio frequency unit 701 receives downlink data from a network device and transmits the downlink data to the processor 710 for processing; and in addition, transmits uplink data to the network device. Generally, the radio frequency unit 701 includes, but is not limited to, an antenna, at least one amplifier, a transceiver, a coupler, a low noise amplifier, a duplexer, and the like.

The memory 709 may be configured to store a software program or instruction and various data. The memory 709 may mainly include a program or instruction storage area and a data storage area. The program or instruction storage area may store an operating system, an application program or instruction required by at least one function (for example, a sound playback function and an image display function), and the like. In addition, the memory 709 may include a high speed random access memory, and may further include a non-volatile memory, where the non-volatile memory may be a read-only memory (ROM), a programmable ROM (PROM), an erasable PROM (Erasable PROM, EPROM), an electrically EPROM (EEPROM), or a flash memory. For example, at least one magnetic disk storage device, a flash memory or another volatile solid-state storage device.

The processor 710 may include one or more processing units. Optionally, the processor 710 may integrate an application processor and a modem processor, where the application processor mainly processes an operating system, a user interface, an application program or instruction, and the like, and the modem processor mainly processes wireless communication, for example, a base band processor. It may be understood that the foregoing modem processor may either not be integrated into the processor 710.

The radio frequency unit 701 is configured to receive a first access control parameter.

The processor 710 is configured to determine a second access control parameter corresponding to the terminal based on the first access control parameter and a preset rule; and perform an access control-related operation according to the second access control parameter.

It should be understood that in this embodiment, the foregoing processor 710 or radio frequency unit 701 can implement various processes implemented by the terminal in the method embodiment of FIG. 2. Details will not be described herein again to avoid repetition.

Figure 8:
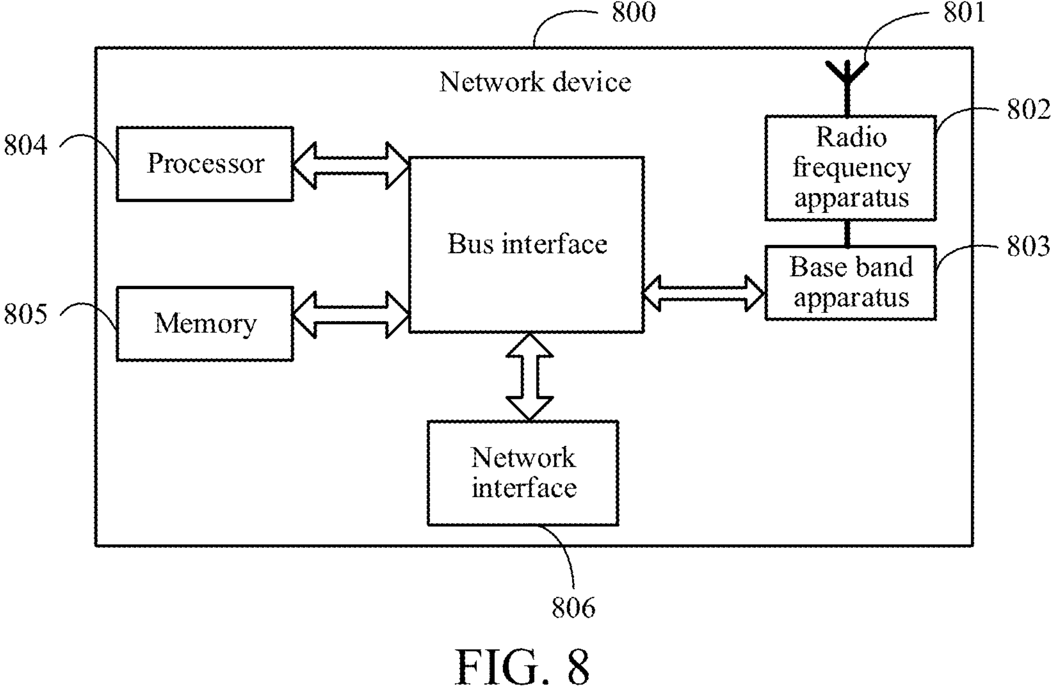
FIG. 8 is a structural diagram of a network device according to an embodiment of this application.

Alternatively, the embodiments of this application further provide a network device. As shown in FIG. 8, the network device 800 includes: an antenna 801, a radio frequency apparatus 802, and a base band apparatus 803. The antenna 801 is connected to the radio frequency apparatus 802. In an upward direction, the radio frequency apparatus 802 receives information through the antenna 801 and transmits the received information to the base band apparatus 803 for processing. In a downward direction, the base band apparatus 803 processes the information to be transmitted and transmits the processed information to the radio frequency apparatus 802. The radio frequency apparatus 802 processes the received information and transmits the processed received information out through the antenna 801.

The foregoing radio frequency apparatus may be located in the base band apparatus 803, and the method executed by the network device in the above embodiments may be implemented in the base band apparatus 803, where the base band apparatus 803 includes a processor 804 and a memory 805.

The base band apparatus 803 may, for example, include at least one base band board, where a plurality of chips are disposed on the base band board. As shown in FIG. 8, one of the chips is, for example, the processor 804, connected with the memory 805 to invoke a program in the memory 805 to perform network device operations shown in the method embodiments above.

The base band apparatus 803 may further include a network interface 806, configured to interact information with the radio frequency apparatus 802, and the network interface is, for example, a common public radio interface (common public radio interface, CPRI).

Alternatively, the network device of this embodiment of this application further includes: instructions or a program stored in the memory 805 and runnable on the processor 804, and the processor 804 invokes the instructions or the program in the memory 805 to perform the method performed by the modules shown in FIG. 5, and achieves the same technical effect, which is not described in detail herein again to avoid repetition.

The embodiments of this application further provide a readable storage medium, storing a program or instructions, where the program or the instructions, when being executed by a processor, implement each process of the foregoing access control method embodiments, and the same technical effect can be achieved, which is not described in detail herein again to avoid repetition.

The foregoing processor is the processor in the communication device described in the foregoing embodiment. The readable storage medium includes a computer-readable storage medium, such as, a read-only memory (ROM), a random access memory (RAM), a magnetic disk, or an optical disk.

The embodiments of this application further provide a chip, including a processor and a communication interface, where the communication interface is coupled to the processor, and the processor is configured to run a network device program or instructions to implement each process of the foregoing random access method embodiments and can achieve the same technical effects, which is not described in detail herein again to avoid repetition.

It is to be understood that the chip mentioned in this embodiment of this application may also be referred to as a system-level chip, a system chip, a chip system, a system chip on a chip, or the like.

It is to be noted that, the term "comprise", "include" or any other variation thereof in this specification is intended to cover a non-exclusive inclusion, which specifies the presence of stated processes, methods, objects, or apparatuses, but does not preclude the presence or addition of one or more other processes, methods, objects, or apparatuses. Without more limitations, elements defined by a sentence "including one" does not exclude that there are still other same elements in the process, method, object, or apparatus. In addition, it is to be noted that, the scope of the method and apparatus in the embodiments of this application is not limited to performing the functions in the order shown or discussed, but may also include performing the functions in a substantially simultaneous manner or in a reverse order according to the functions involved, for example, the described method may be performed in a sequence different from the described order, and various steps may also be added, omitted, or combined. In addition, features described with reference to certain examples may be combined in other examples.

A person of ordinary skill in the art may notice that the exemplary units and algorithm steps described with reference to the embodiments disclosed in this specification can be implemented in electronic hardware, or a combination of computer software and electronic hardware. Whether the functions are executed in a mode of hardware or software depends on particular applications and design constraint conditions of the technical solutions. A person skilled in the art may use different methods to implement the described functions for each particular application, but such implementation is not to be considered beyond the scope of the present disclosure.

A person skilled in the art may clearly understand that for convenience and conciseness of description, for specific working processes of the foregoing systems, apparatuses and units, reference may be made to the corresponding processes in the foregoing method embodiments, and details are not described herein again.

In the embodiments provided in this application, it is to be understood that the disclosed apparatus and method may be implemented in other manners. For example, the apparatus embodiments described above are merely illustrative. For example, a division of the units is merely a logical function division and may be other division during actual implementation. For example, a plurality of units or components may be combined or integrated into another system, or some features may be omitted or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to an actual requirement to achieve the objectives of the solutions in the embodiments.

In addition, functional units in the embodiments of the present disclosure may be integrated into one processing unit, or each of the units may be physically separated, or two or more units may be integrated into one unit.

Through the descriptions of the foregoing implementations, a person skilled in the art may clearly understand that the method according to the foregoing embodiments may be implemented by means of software and a necessary general hardware platform, and certainly, may also be implemented by hardware, but in many cases, the former manner is a better implementation. Based on such an understanding, the technical solutions of this application essentially or the part contributing to the prior art may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, a base station, or the like) to perform the methods described in the embodiments of this application.

It may be understood that the embodiments described in the embodiments of the present disclosure may be implemented by hardware, software, firmware, middleware, microcode, or a combination thereof. For hardware implementation, the processing unit may be implemented by one or more application specific integrated circuits (ASIC), digital signal processors (DSP), digital signal processor devices (DSPD), programmable logic devices (PLD), field-programmable gate arrays (FPGA), general-purpose processors, controllers, microcontrollers, microprocessors, other electronic components configured to implement the functions of the present disclosure, or a combination thereof.

For implementation by software, the technologies in the embodiments may be implemented by performing the functional modules (for example, a process and a function) in the embodiments of the present disclosure. Software code may be stored in a memory and executed by a processor. The memory may be implemented inside or outside the processor.

The embodiments of this application are described above with reference to the accompanying drawings, but this application is not limited to the foregoing specific embodiments, which are merely illustrative rather than limited. Under the inspiration of this application, a person of ordinary skill in the art can make many forms without departing from the scope of this application and the protection of the claims, all of which fall within the protection of this application.

What is claimed is:

1. An access control method performed by a terminal, comprising:

receiving a first access control parameter, wherein the first access control parameter comprises a first set of access control parameters and a second set of access control parameters;

wherein the first access control parameter comprises an access-prohibition factor of access control, the first set of access control parameters comprises a first value of the access-prohibition factor of access control, and the second set of access control parameters comprises a second value of the access-prohibition factor of access control;

determining the first set of access control parameters is a second access control parameter when a preset condition is met;

determining the second set of access control parameters is the second access control parameter when the preset condition is not met; and performing an access control-related operation according to the second access control parameter;

wherein the preset condition comprises:

an antenna quantity is less than 4, equal to 2, or equal to 1.

2. The method according to claim 1, wherein the first access control parameter is carried through at least one of the following: a physical broadcast channel (PBCH), a master information block (MIB), system information of a first system information block (SIB), extended system information, or a dedicated radio resource control (RRC) message, wherein the first SIB is an SIB corresponding to a first type of terminal.

3. The method according to claim 2, wherein the extended system information comprises at least one of the following:

system information corresponding to a second type of terminal in a first SIB1, wherein the first SIB1 belongs to the first SIB;

system information corresponding to the second type of terminal in an SIBx, wherein x is an integer greater than 1, the SIBx belongs to a second SIB, and the second SIB is an SIB corresponding to the second type of terminal; or system information corresponding to the second type of terminal in an SIBy, wherein y is an integer greater than 1, and the SIBy belongs to the first SIB.

4. The method according to claim 3, wherein the system information corresponding to the second type of terminal in the first SIB 1 is used for indicating any one of the following:

system information supporting the second type of terminal; or system information allowing the second type of terminal to camp on or access.

5. The method according to claim 3, wherein the system information corresponding to the second type of terminal in the SIBx and the SIB y are used for indicating: system information required by a cell accessed or camped on by the second type of terminal.

6. The method according to claim 3, wherein the second type of terminal is a lightweight terminal.

7. The method according to claim 1, wherein the first access control parameter further comprises at least one of the following:

an access control category;

access control public land mobile network information;

a probability parameter of access control;

duration-related information of access control;

identification information corresponding to access control;

type information corresponding to access control;

access control level information;

a reason value for establishing a radio resource control (RRC) connection;

an access attempt category; or event information corresponding to access control.

8. The method according to claim 1, wherein the performing an access control-related operation according to the second access control parameter comprises at least one of the following:

in a case of determining that a first cell is prohibited to be accessed according to the second access control parameter, performing a first operation; or in a case of determining that the first cell is accessible according to the second access control parameter, performing a second operation, wherein the first operation comprises at least one of the following:

not allowing to camp on the first cell;

prohibiting to access the first cell or prohibiting to access the first cell in a preset time;

not accessing the first cell or not allowing to perform an access attempt for the first cell; or choosing or re-choosing a cell; and the second operation comprises at least one of the following:

allowing to camp on the first cell;

not prohibiting to access the first cell;

allowing to access the first cell; or allowing to perform an access attempt for the first cell.

9. An access control method performed by a network device, comprising:

transmitting a first access control parameter, wherein the first access control parameter comprises a first set of access control parameters and a second set of access control parameters, wherein the first access control parameter comprises an access-prohibition factor of access control, the first set of access control parameters comprises a first value of the access-prohibition factor of access control, and the second set of access control parameters comprises a second value of the access-prohibition factor of access control; wherein the first access control parameter is used for determining the first set of access control parameters is a second access control parameter when a preset condition is met, and determining the second set of access control parameters is the second access control parameter when the preset condition is not met, wherein the preset condition comprises:

an antenna quantity is less than 4, equal to 2, or equal to 1.

10. The method according to claim 9, wherein the first access control parameter is carried through at least one of the following: a physical broadcast channel (PBCH), a master information block (MIB), system information of a first system information block (SIB), extended system information, or a dedicated RRC message, wherein the first SIB is an SIB corresponding to a first type of terminal.

11. The method according to claim 10, wherein the extended system information comprises at least one of the following:

system information corresponding to a second type of terminal in a first SIB1, wherein the first SIB1 belongs to the first SIB;

system information corresponding to the second type of terminal in an SIBx, wherein x is an integer greater than 1, the SIBx belongs to a second SIB, and the second SIB is an SIB corresponding to the second type of terminal; or system information corresponding to the second type of terminal in an SIBy, wherein y is an integer greater than 1, and the SIBy belongs to the first SIB.

12. The method according to claim 11, wherein the system information corresponding to the second type of terminal in the first SIB 1 is used for indicating any one of the following:

system information supporting the second type of terminal; or system information allowing the second type of terminal to camp on or access.

13. The method according to claim 11, wherein the system information corresponding to the second type of terminal in the SIBx and the SIBy is used for indicating:

system information required by a cell accessed or camped on by the second type of terminal.

14. The method according to claim 11, wherein the second type of terminal is a lightweight terminal.

15. A communication device, comprising:

a processor; and a memory storing a program or instruction that is runnable on the processor, wherein the program or instruction, when executed by the processor, causes the communication device to perform the access control method according to claim 11.

16. The method according to claim 9, wherein the first access control parameter further comprises at least one of the following:

an access control category;

access control public land mobile network information;

a probability parameter of access control;

duration-related information of access control;

identification information corresponding to access control;

type information corresponding to access control;

access control level information;

a reason value for establishing a radio resource control (RRC) connection;

an access attempt category; or event information corresponding to access control.

17. A communication device, comprising:

a processor; and a memory storing a program or instruction that is runnable on the processor, wherein the program or instruction, when executed by the processor, causes the communication device to:

receive a first access control parameter, wherein the first access control parameter comprises a first set of access control parameters and a second set of access control parameters; wherein the first access control parameter comprises an access-prohibition factor of access control, the first set of access control parameters comprises a first value of the access-prohibition factor of access control, and the second set of access control parameters comprises a second value of the access-prohibition factor of access control;

determine the first set of access control parameters is a second access control parameter when a preset condition is met;

determine the second set of access control parameters is the second access control parameter when the preset condition is not met; and perform an access control-related operation according to the second access control parameter;

wherein the preset condition comprises:

an antenna quantity is less than 4, equal to 2, or equal to 1.

18. The communication device according to claim 17, wherein the first access control parameter is carried through at least one of the following: a physical broadcast channel (PBCH), a master information block (MIB), system information of a first system information block (SIB), extended system information, or a dedicated radio resource control (RRC) message, wherein the first SIB is an SIB corresponding to a first type of terminal.

19. The communication device according to claim 18, wherein the extended system information comprises at least one of the following:

system information corresponding to a second type of terminal in a first SIB1, wherein the first SIB1 belongs to the first SIB;

system information corresponding to the second type of terminal in an SIBx, wherein x is an integer greater than 1, the SIBx belongs to a second SIB, and the second SIB is an SIB corresponding to the second type of terminal; or system information corresponding to the second type of terminal in an SIBy, wherein y is an integer greater than 1, and the SIBy belongs to the first SIB.

20. The communication device according to claim 19, wherein the system information corresponding to the second type of terminal in the first SIB1 is used for indicating any one of the following:

system information supporting the second type of terminal; or system information allowing the second type of terminal to camp on or access.

* * * * *